(12) United States Patent
Hicks et al.

(10) Patent No.: US 11,157,268 B2
(45) Date of Patent: Oct. 26, 2021

(54) LINKING COPIED CODE

(71) Applicant: INTERNATIONAL BUSINESS MACHINES CORPORATION, Armonk, NY (US)

(72) Inventors: Andrew C. M. Hicks, Wappingers Falls, NY (US); Michael Terrence Cohoon, Fishkill, NY (US); Ryan Thomas Rawlins, New Paltz, NY (US); Michael E. Gildein, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/750,093

(22) Filed: Jan. 23, 2020

(65) Prior Publication Data

US 2021/0232387 A1 Jul. 29, 2021

(51) Int. Cl.
*G06F 9/44* (2018.01)
*G06F 16/27* (2019.01)
(Continued)

(52) U.S. Cl.
CPC ............... *G06F 8/71* (2013.01); *G06F 16/23* (2019.01); *G06F 8/65* (2013.01); *G06F 16/178* (2019.01); *G06F 16/2255* (2019.01); *G06F 16/44* (2019.01); *G06F 40/166* (2020.01); *G06F 40/174* (2020.01); *G06F 40/197* (2020.01)

(58) Field of Classification Search
CPC ... G06F 8/71; G06F 8/65; G06F 16/23; G06F 16/178; G06F 16/44; G06F 16/2255; G06F 9/543; G06F 40/174; G06F 40/166; G06F 40/197; G06F 40/143
See application file for complete search history.

(56) References Cited

U.S. PATENT DOCUMENTS 6,098,079 A 8/2000 Howard
6,735,741 B1 5/2004 Pannu
(Continued)

FOREIGN PATENT DOCUMENTS

CN 107423626 A 12/2017
EP 1035482 A2 9/2000

OTHER PUBLICATIONS

Patricia Jablonski, Managing the Copy-and-Paste Programming Practice in Modern IDEs, Oct. 21-25, 2007, [Retrieved on May 26, 2021], Retrieved from the internet: <URL: https://dl.acm.org/doi/pdf/10.1145/1297846.1297952> 2 Pages (933-934) (Year: 2007).*
(Continued)

*Primary Examiner* — Anibal Rivera
(74) *Attorney, Agent, or Firm* — Cantor Colburn LLP; Teddi Maranzano

(57) ABSTRACT

Aspects of the invention include receiving, by a processor, a request to copy a code from a source file and receiving, by the processor, a request to paste the code into a destination file. Aspects also include creating, by the processor based at least in part on the request to paste the code, an entry in a database, the entry having an identification of the source file, an identification of the destination file, a location of the code in the source file, and a location of the code in the destination file.

15 Claims, 6 Drawing Sheets

(51) Int. Cl.
*G06F 8/71* (2018.01)
*G06F 16/23* (2019.01)
G06F 40/174 (2020.01)
G06F 8/65 (2018.01)
G06F 16/178 (2019.01)
G06F 16/44 (2019.01)
G06F 40/197 (2020.01)
G06F 40/166 (2020.01)
G06F 16/22 (2019.01)

(56) References Cited

U.S. PATENT DOCUMENTS

| | | | |
|---|---|---|---|
| 7,529,779 B2 | 5/2009 | Herle et al. | |
| 7,689,925 B2 * | 3/2010 | Hahn | G06F 9/543 |
| | | | 715/770 |
| 8,392,830 B2 * | 3/2013 | Hutchison | G06F 40/143 |
| | | | 715/256 |
| 8,667,411 B2 * | 3/2014 | Miyoshi | G06F 40/166 |
| | | | 715/770 |
| 8,898,627 B2 * | 11/2014 | Gass | G06F 8/65 |
| | | | 717/106 |
| 9,384,177 B2 * | 7/2016 | Sakurai | G06F 16/16 |
| 9,953,054 B2 * | 4/2018 | Collins | G06F 16/2255 |
| 10,133,708 B2 * | 11/2018 | Carro | G06F 40/117 |
| 2009/0013248 A1 * | 1/2009 | Hutchison | G06F 9/543 |
| | | | 715/256 |
| 2009/0292994 A1 * | 11/2009 | Lwo | G06F 9/543 |
| | | | 715/733 |
| 2011/0173555 A1 * | 7/2011 | Miyoshi | G06F 40/166 |
| | | | 715/770 |
| 2011/0283269 A1 * | 11/2011 | Gass | G06F 8/65 |
| | | | 717/168 |
| 2012/0303684 A1 * | 11/2012 | Sakurai | G06F 40/197 |
| | | | 707/827 |
| 2013/0268850 A1 * | 10/2013 | Kyprianou | G06F 40/166 |
| | | | 715/255 |
| 2014/0250091 A1 * | 9/2014 | Wu | G06F 16/44 |
| | | | 707/694 |
| 2014/0304628 A1 * | 10/2014 | Soni | G06F 40/174 |
| | | | 715/764 |
| 2014/0317087 A1 * | 10/2014 | Collins | G06F 16/2255 |
| | | | 707/715 |
| 2018/0276057 A1 * | 9/2018 | Chen | H04L 67/02 |
| 2019/0095197 A1 * | 3/2019 | Ross | G06F 8/36 |
| 2020/0233879 A1 * | 7/2020 | Papanicolaou | G06F 16/178 |

OTHER PUBLICATIONS

Zhenmin Li et al., CP-Miner: Finding Copy-Paste and Related Bugs in Large-Scale Software Code, Mar. 2006, [Retrieved on May 26, 2021], Retrieved from the internet: <URL: https://ieeexplore.ieee.org/stamp/stamp.jsp?tp=&arnumber=1610609> 17 Pages (176-192) (Year: 2006).*

Mell, Peter et al. "The NIST Defnition of Cloud Computing—Recommendations of the National Institute of Standards and Technology"; U.S. Department of Commerce; Computer Security Division; Sep. 2011; NIST Special Publication 800-145; 7 pgs.

* cited by examiner

LINKING COPIED CODE

BACKGROUND

The present invention generally relates to software development, and more specifically, to linking code copied during software development.

When writing code for computer programs, previously written program code is often re-used, whether as an exact copy or in a slightly modified form. In general, when a problem is identified in a piece of code, it is often only fixed in the one place that the problem was identified and not in other locations with similar code. This results in one piece of code getting fixed, but other areas with the same code are not corrected.

SUMMARY

Embodiments of the present invention are directed to linking copied code. A non-limiting example computer-implemented method includes receiving a request to copy a code from a source file and receiving a request to paste the code into a destination file. The computer-implemented method also includes creating, based at least in part on the request to paste the code, an entry in a database, the entry having an identification of the source file, an identification of the destination file, a location of the code in the source file, and a location of the code in the destination file.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide methods, systems, and computer program products for linking copied code during software development. In accordance with one or more embodiments of the present invention, a software development environment (SDE) is configured to maintain a database of code that is copied and pasted, either between two different programs or within a single program. In exemplary embodiments, the database includes an identification of a source location and a destination location of the copied code and, in some embodiments, also contains a copy of the copied code.

As a software developer is creating, or modifying, a program the SDE is configured to create new entries in the database upon detecting a copy/paste function being used. In one embodiment, the use of a traditional copy/paste function triggers the creation of a new entry in the database. In other embodiments, a separate copy/paste function is used to indicate that a new entry should be created. Once the database entry has been created, changes to the code in the source and destination locations are tracked and depending upon the nature and scope of the detected changes various actions are taken. In exemplary embodiments, different actions are taken upon detecting a change to the code in the source location versus the destination location. For example, a change to the code in the source location may be automatically propagated to the destination location while a change to the destination location may result in the entry in the database being removed.

Figure 1:
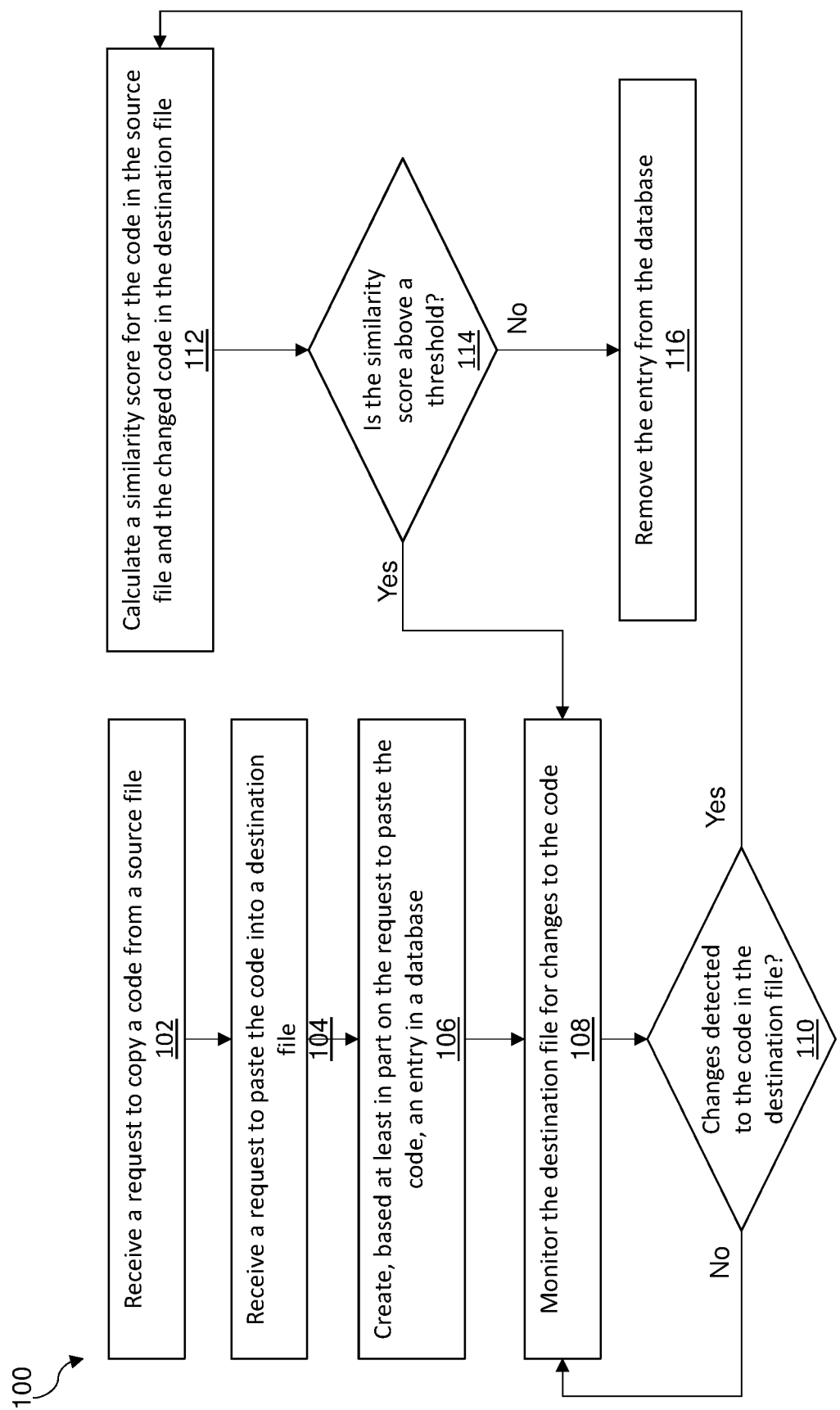
FIG. 1 depicts a flow diagram of a method for linking copied code according to one or more embodiments of the present invention.

Turning now to FIG. 1, a flow diagram of a method 100 for linking copied code is generally shown in accordance with one or more embodiments of the present invention. The method 100 shown in FIG. 1 may be executed by an operating system, such as OS 611 of FIG. 6, executing on a computer processor. The computer processor can be a stand-alone processor or a node in a cloud, such as node 10 in FIG. 4.

As shown at block 102, the method 100 includes receiving a request to copy a code from a source file. In an exemplary embodiment, the copy request can be made by a user by clicking on a graphical user interface (GUI) copy button, pressing CTRL+C, or by other known methods. Next, as shown at block 104, the method 100 includes receiving a request to paste the code into a destination file. In exemplary embodiment, the paste request can be made by a user by clicking on a graphical user interface (GUI) paste button, pressing CTRL+V, or by other known methods. In one embodiment, a separate paste button or command in the SDE is used to indicate that in addition to pasting the code, the user would like an association created between the source file and the destination file. In other embodiments, the default copy/paste functions are configured to automatically trigger the creation of an association between the source file and the destination file. Next as shown at block 106, method 100 includes creating, based at least in part on the request to paste the code, an entry in a database. In exemplary embodiments, the database is configured to link code copied from a source file and pasted into a destination file. In exemplary embodiments, when an entry in the database is created, the user is prompted to enter, or select, the desired linkage threshold and a preferred action to be taken upon detecting changes in the code in the source file.

Next, as shown at block 108, the method 100 includes monitoring the destination file for changes to the code. At decision block 110, it is determined if changes have been made to the code in the destination file. If so, the method 100 proceeds to block 112. Otherwise, method 100 returns to block 108 and continues monitoring the destination file for changes to the code. As shown at block 112, the method 100 includes calculating a similarity score for the code in the source file and the changed code in the destination file. In exemplary embodiments, the similarity score can be created using algorithms, such as cosine similarity, to compare the versions of the code. Next, as shown at decision block 114, if the similarity score is above a threshold value, the method 100 returns to block 108 and continues monitoring the destination file for changes to the code. Otherwise, the method 100 proceeds to block 116 and removes the entry from the database. In exemplary embodiments, the threshold value is obtained from the entry in the database. In one embodiment, a user may specify a threshold value upon creation of the entry in the database. In another embodiment, a default value is used for the threshold value.

Figure 2:
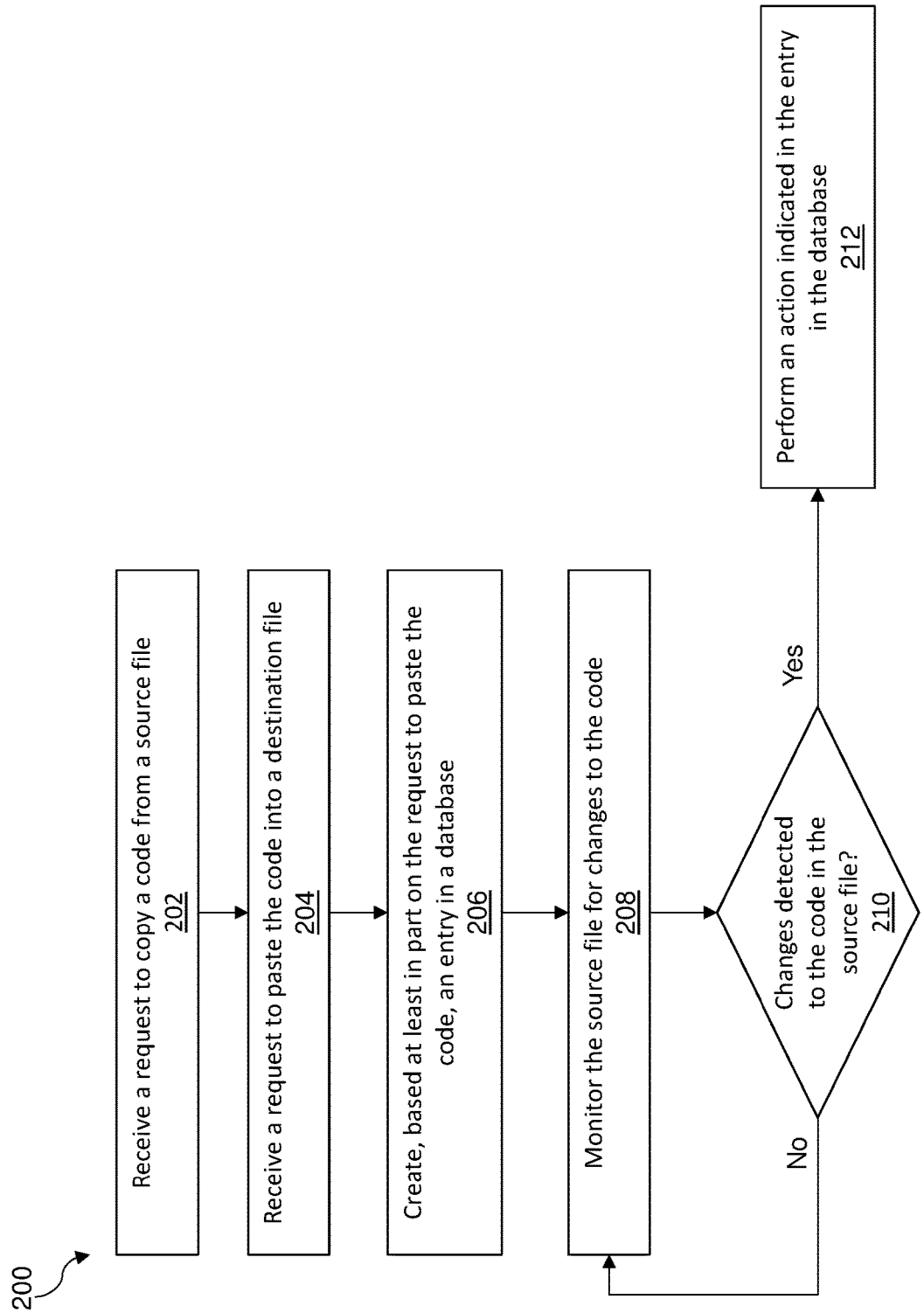
FIG. 2 depicts a flow diagram of another method for linking copied code according to one or more embodiments of the present invention.

Turning now to FIG. 2, a flow diagram of a method 200 for linking copied code is generally shown in accordance with one or more embodiments of the present invention. The method 200 shown in FIG. 2 may be executed by an operating system, such as OS 611 of FIG. 6, executing on a computer processor. The computer processor can be a stand-alone processor or a node in a cloud, such as node 10 in FIG. 4.

As shown at block 202, the method 200 includes receiving a request to copy a code from a source file. Next, as shown at block 204, the method 200 includes receiving a request to paste the code into a destination file. The method 200 also includes creating, based at least in part on the request to paste the code, an entry in a database, as shown at block 206. In exemplary embodiments, the database is configured to link code copied from a source file and pasted into a destination file. Next, as shown at block 208, the method 200 includes monitoring the source file for changes to the code. As shown at decision block 210, if changes are not detected to the code in the source file, the method 200 returns to block 208 and continues to monitor the source file. Otherwise, the method 200 proceeds to block 212 and performs an action indicated in the entry in the database.

In one embodiment, the action includes creating a notification that the code in the source file was updated. In exemplary embodiments, the notification includes an identification of the source file, the destination file and a copy of the code with an indication of the changes that were made, i.e. a marked-up copy of the code. In exemplary embodiments, the notification includes an option for the user to apply the changes shown to the code in the destination file. In another embodiment, the action includes automatically applying changes detected in the code in the source file to the code in the destination file. In another embodiment, the action includes removing the database entry from the database.

The flow diagrams of FIGS. 1 and 2 are not intended to indicate that the operations of methods 100, 200 are to be executed in any particular order, or that all of the operations of methods 100, 200 are to be included in every case. Additionally, methods 100, 200 can include any suitable number of additional operations.

Figure 3:
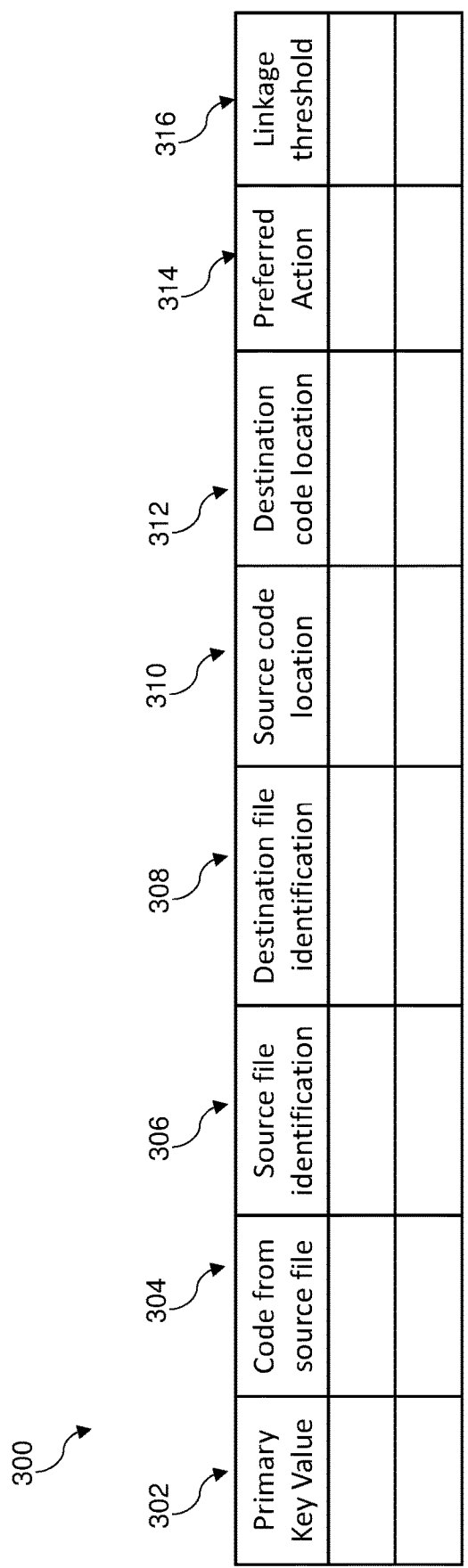
FIG. 3 depicts a block diagram of a database for linking copied code according to one or more embodiments of the present invention.

Turning now to FIG. 3, a block diagram of a database 300 for linking copied code is generally shown in accordance with one or more embodiments of the present invention. In exemplary embodiments, the database 300 includes an entry for each section of code that is copied and pasted in a software development environment. Each entry includes one or more of a primary key value 302, a copy of the code from the source file 304, an identification of the source file 306, an identification of the destination file 308, a location of the code in the source file 310, a location of the code in the destination file 312, an indication of a preferred action 314 and a linkage threshold 316.

In exemplary embodiments, the primary key value 302 is a value that is created by applying a hashing algorithm to the code that is copied and pasted. In one embodiment, the identification of the source file 306 and the identification of the destination file 308 include a file name and a storage location of the file. In one embodiment, the location of the code in the destination file 312 and the location of the code in the source file 310 include line numbers of the copied/pasted code in the source/destination file.

In exemplary embodiments, the indication of a preferred action 314 indicates a preferred action to be taken upon a determination that the code in the source location is changed. In one embodiment, the preferred action 314 is an automatic update option that causes any changes detected to the code in the source file to be automatically applied to the code in the destination file. In one embodiment, the preferred action 314 is a notify action which causes a notification to be created that includes a copy of the code including an indication of the detected changes. In exemplary embodiments, the notification also includes an option for a user to apply the detected changes to the code in the destination file.

In exemplary embodiments, the linkage threshold 316 is a minimum similarity between a modified code in a destination file and the code in the source file that is required to maintain the linkage between the files. In exemplary embodiments, when changes in the code are detected, either in the source file or in the destination file, the code in the two files are compared using any of a variety of known methods to create a similarity score. If the similarity score falls below the linkage threshold 316, the entry is removed from the database 300. In exemplary embodiments, a user may specify a threshold value upon creation of the entry in the database. In another embodiment, a default value is used for the threshold value.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
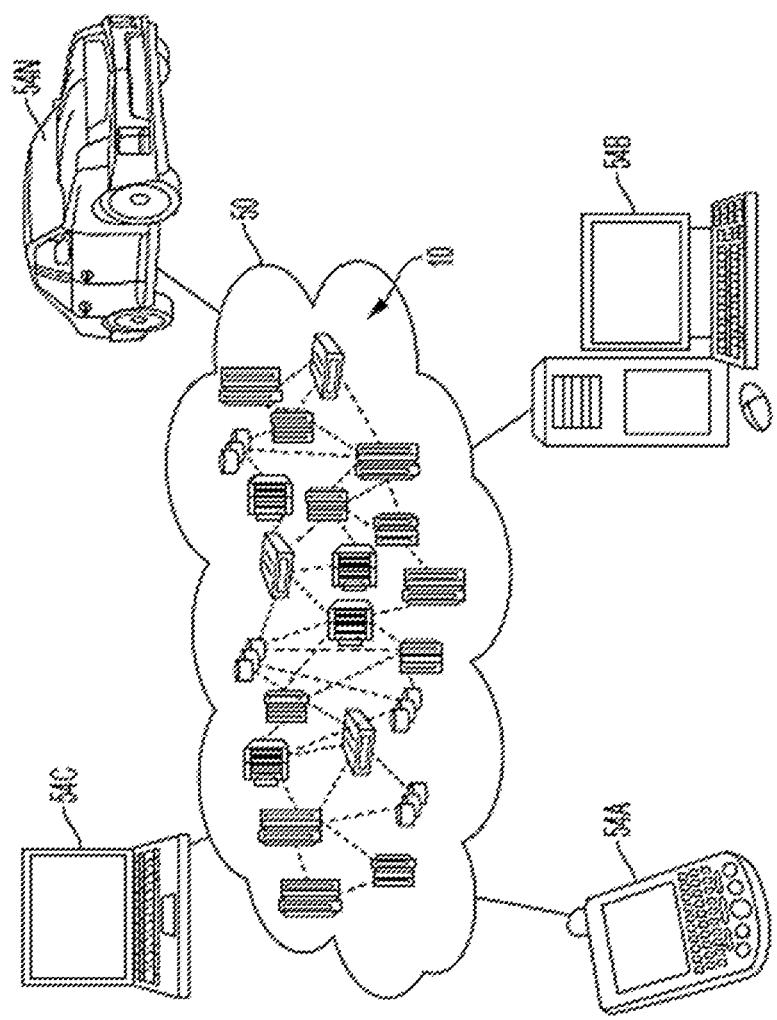
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
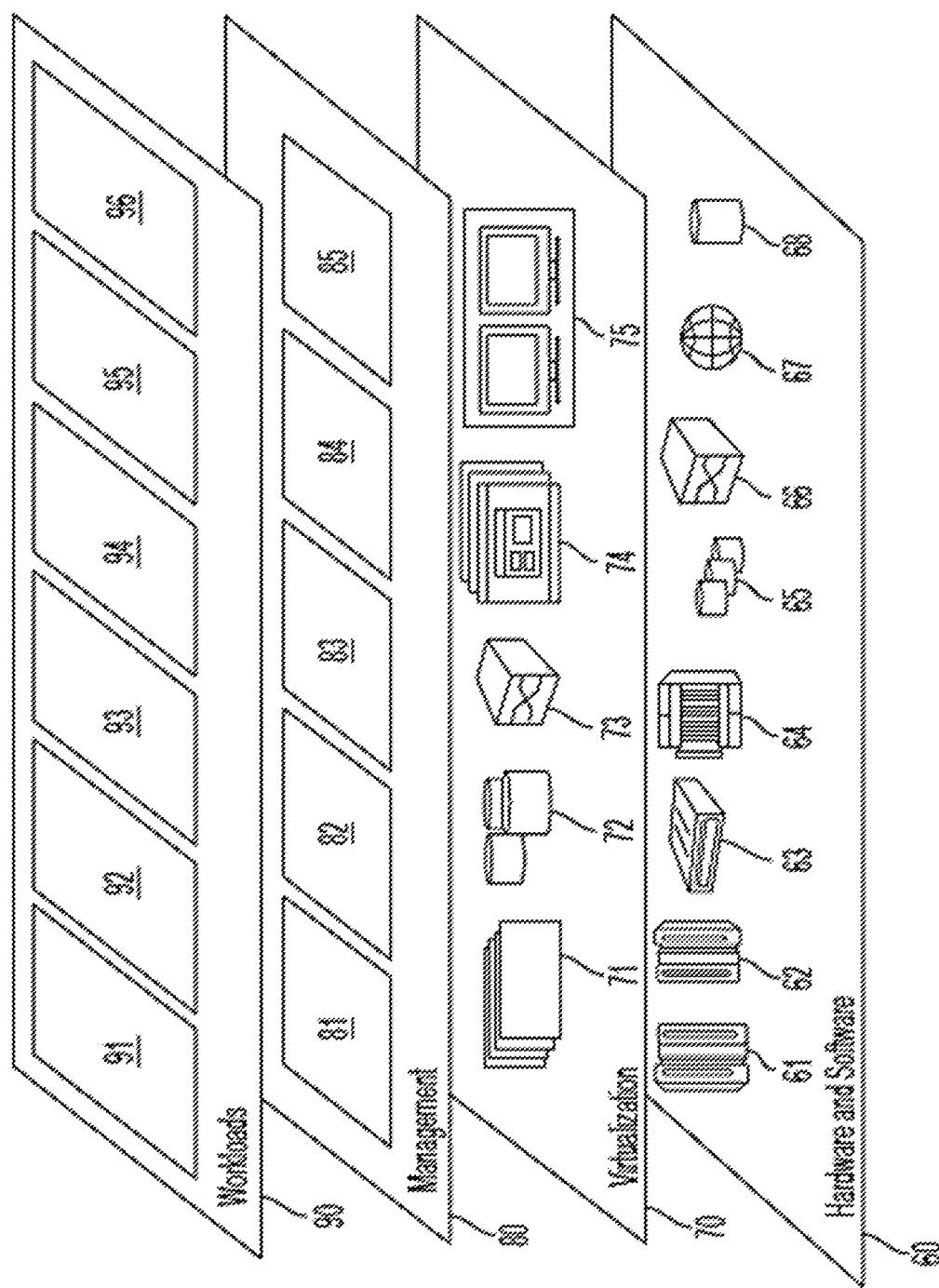
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and link of copied code 96.

It is understood that one or more embodiments of the present invention are capable of being implemented in conjunction with any type of computing environment now known or later developed.

Figure 6:
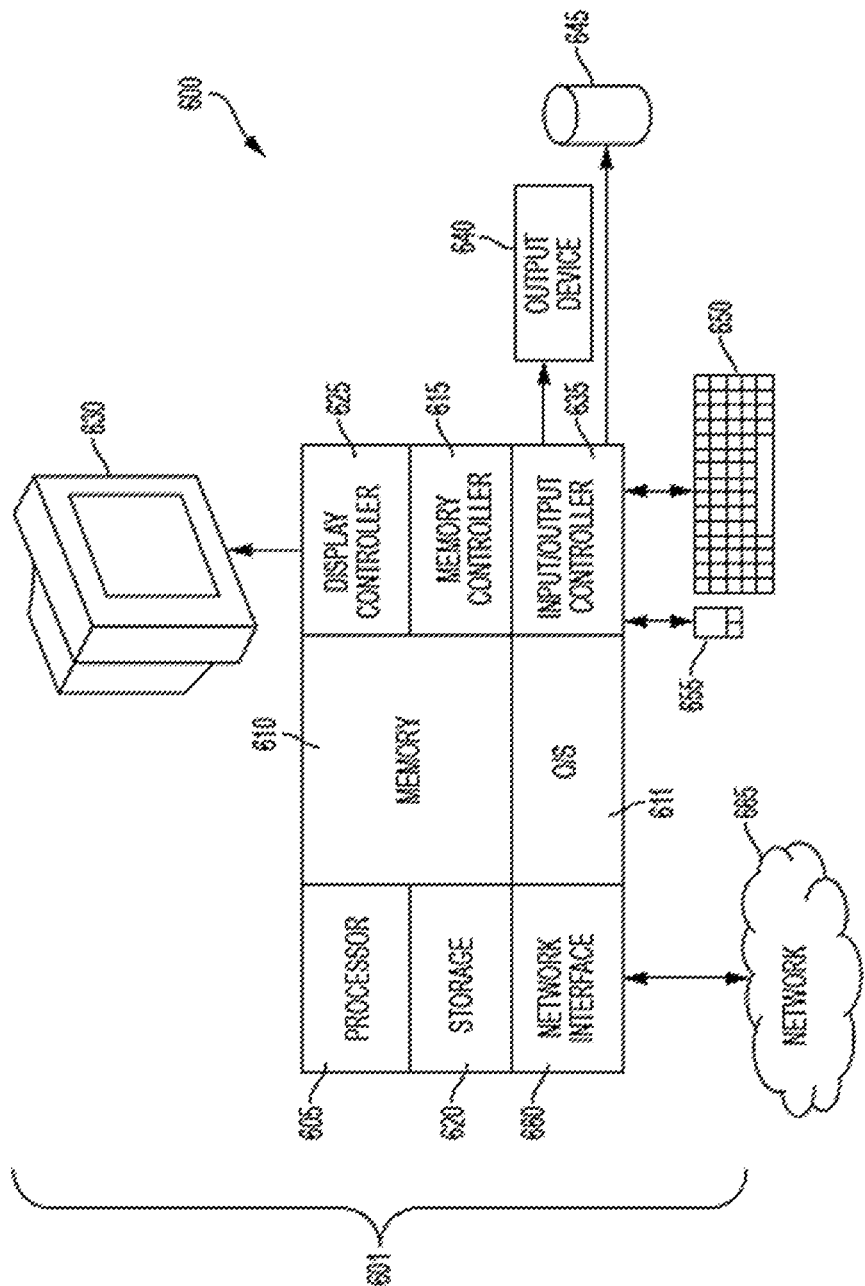
FIG. 6 illustrates a processing system for linking copied code according to one or more embodiments of the present invention.

Turning now to FIG. 6, a computer system for buffer overflow trapping is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for linking copied code, the method comprising:
   receiving, by a processor, a request to copy code from a source file;
   receiving, by the processor, a request to paste the code into a destination file;
   creating, by the processor based at least in part on the request to paste the code, an entry in a database, the entry comprising an identification of the source file, an identification of the destination file, a location of the code in the source file, and a location of the code in the destination file;
   monitoring, by the processor, the destination file for changes to the code;
   calculating, by the processor based at least in part on detecting changes to the code in the destination file, a similarity score between the code in the source file and the changed code in the destination file; and based upon a determination that the similarity score is less than a threshold, deleting, by the processor, the entry in the database.

2. The method of claim 1, further comprising monitoring, by the processor, the source file for changes to the code.

3. The method of claim 2, wherein the entry in the database includes an action to be taken upon detecting changes in the source file.

4. The method of claim 3, wherein the action includes automatically applying changes detected to the code in the source file to the code in the destination file.

5. The method of claim 3, wherein the action includes creating a notification of the changes detected to the code in the source file.

6. The method of claim 1, wherein the entry in the database further includes a copy of the code.

7. The method of claim 1, wherein the entry in the database further includes a primary key value that is created by applying a hashing algorithm to the code.

8. A system comprising:
one or more processors for executing computer-readable instructions, the computer-readable instructions controlling the one or more processors to perform operations comprising:
receiving, by a processor, a request to copy code from a source file;
receiving, by the processor, a request to paste the code into a destination file;
creating, by the processor based at least in part on the request to paste the code, an entry in a database, the entry comprising an identification of the source file, an identification of the destination file, a location of the code in the source file, and a location of the code in the destination file;
monitoring, by the processor, the destination file for changes to the code;
calculating, by the processor based at least in part on detecting changes to the code in the destination file, a similarity score between the code in the source file and the changed code in the destination file; and
based upon a determination that the similarity score is less than a threshold, deleting, by the processor, the entry in the database.

9. The system of claim 8, wherein the operations further comprise monitoring, by the processor, the source file for changes to the code.

10. The system of claim 9, wherein the entry in the database includes an action to be taken upon detecting changes in the source file.

11. The system of claim 10, wherein the action includes automatically applying changes detected to the code in the source file to the code in the destination file.

12. The system of claim 10, wherein the action includes creating a notification of the changes detected to the code in the source file.

13. The system of claim 8, wherein the entry in the database further includes a copy of the code.

14. The system of claim 8, wherein the entry in the database further includes a primary key value that is created by applying a hashing algorithm to the code.

15. A computer program product comprising a computer-readable storage medium having program instructions embodied therewith, the program instructions executable by a processor to cause the processor to perform operations comprising:
receiving, by a processor, a request to copy a code from a source file;
receiving, by the processor, a request to paste the code into a destination file;
creating, by the processor based at least in part on the request to paste the code, an entry in a database, the entry comprising an identification of the source file, an identification of the destination file, a location of the code in the source file, and a location of the code in the destination file;
calculating, by the processor based at least in part on detecting changes to the code in the destination file, a similarity score between the code in the source file and the changed code in the destination file; and
based upon a determination that the similarity score is less than a threshold, deleting, by the processor, the entry in the database.

* * * * *